(12) United States Patent
Bedeschi et al.

(10) Patent No.: US 12,437,787 B2
(45) Date of Patent: Oct. 7, 2025

(54) THRESHOLD COMPENSATED DETECTOR FOR MEMORY SENSE

(71) Applicant: Micron Technology, Inc., Boise, ID (US)

(72) Inventors: Ferdinando Bedeschi, Biassono (IT); Umberto Di Vincenzo, Capriate San Gervasio (IT); Michele Maria Venturini, Milan (IT)

(73) Assignee: Micron Technology, Inc., Boise, ID (US)

( * ) Notice: Subject to any disclaimer, the term of this patent is extended or adjusted under 35 U.S.C. 154(b) by 142 days.

(21) Appl. No.: 18/518,126

(22) Filed: Nov. 22, 2023

(65) Prior Publication Data

US 2024/0212752 A1  Jun. 27, 2024

Related U.S. Application Data

(60) Provisional application No. 63/435,498, filed on Dec. 27, 2022.

(51) Int. Cl.
*G11C 7/06* (2006.01)

(52) U.S. Cl.
CPC ................................ *G11C 7/067* (2013.01)

(58) Field of Classification Search
CPC ..................................................... G11C 7/067
See application file for complete search history.

(56) References Cited

U.S. PATENT DOCUMENTS

| | | |
|---|---|---|
| 6,191,620 B1 | 2/2001 | Lattimore et al. |
| 2014/0269031 A1* | 9/2014 | Jung ............... G11C 11/1693 365/158 |

* cited by examiner

*Primary Examiner* — Jay W. Radke
(74) *Attorney, Agent, or Firm* — Schwegman Lundberg & Woessner, P.A.

(57) ABSTRACT

A detection circuit may be configured to receive an input signal indicative of a data state and to detect the data state using charge sharing between two capacitors to achieve detection with threshold compensation. The detection circuit may include semi-latch circuitry and boosting circuitry to expedite the detection, thereby achieving high speed at low power consumption and low circuit size.

20 Claims, 7 Drawing Sheets

THRESHOLD COMPENSATED DETECTOR FOR MEMORY SENSE

PRIORITY APPLICATION

This application claims the benefit of priority to U.S. Provisional Application Ser. No. 63/435,498, filed Dec. 27, 2022, which is incorporated herein by reference in its entirety.

BACKGROUND

A memory device, such as a dynamic random access memory (DRAM) device, can include memory cells each configured to store a binary data bit (1 or 0) and produce a signal on a bit line that represents the data bit. To read the data bit from a memory cell, a sense circuit including a detector can be used to detect the data bit as "1" (logic high) or "0" (logic low) using the signal on the bit line. A memory chip can include many sense circuits (e.g., one per column of memory cells). Size, power consumption, and reliability of the detectors at high speed substantially determine capacity, power consumption, and speed of the memory chip.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses, among other things, a circuit and method for detecting a data state in a memory cell. Examples of a detector used in a sense circuit of a memory device include an inverter and an analog comparator (e.g., an open-loop operational amplifier). Using an inverter as the detector provides a fast and small circuit that has limitations such as a threshold fixed by transistor characteristics, power consumption depending on the input signal slope (low power consumption with fast input transition but high power consumption with slow input transition), and device-to-device unreliability due to threshold mismatches between transistors. Compared to the inverter, using an analog comparator as the detector provides for higher precision, better reliability (e.g., resulting from mismatch compensation), and a greater range of voltage threshold settings but at a higher power consumption, especially DC power consumption, and a larger circuit size. In an example, the analog comparator is characterized by an open-loop operational amplifier. One of the differential inputs of the operational amplifier receives the input signal. The other of the differential inputs of the operational amplifier receives a voltage reference to which the input signal is to be compared. The detection threshold in this case is set by the voltage reference (which can be adjustable), rather than the characteristics of the transistors (as in the case of the inverter). Thus, the inverter and the analog comparator have different advantages and disadvantages when being used as a detector. What is needed is a detector that share their advantages without also sharing their disadvantages.

The present subject matter provides a detector circuit that has characteristics including small size (occupying a small area on a chip), low sensitivity to process variations, high sensitivity to small and quick input variations or transients, low power consumption, fast transition between detections, and ability to switch off the memory cell after feedback read. Switching off the memory cell in this manner can require a low voltage detector output and, at the same time, a feedback signal that can turn off a high voltage node. The present detector circuit meets these two requirements, which are in contrast and difficult to meet at the same time.

The present subject matter uses detection circuitry with charge sharing between two capacitors for compensation of threshold voltage of an input PMOS transistor and boosting circuitry to expedite the charge sharing, thereby providing a small, fast, low power, and reliable circuit for detecting the binary state (1 or 0) of a memory cell. Some terms/acronyms used in this document, including the drawings, include:

NMOS transistor: n-channel metal-oxide-semiconductor field-effect transistor (MOSFET);
PMOS transistor: p-channel metal-oxide-semiconductor field-effect transistor (MOSFET);
IN: input (into the detector circuit);
OUT: output (from the detector circuit);
VPP: programming power voltage, a power supply voltage (e.g., 4-5 V);

GND: power supply ground (representing an example of a reference voltage level);

SW1: a first digital switching signal controlling operation of the detection circuit; and SW2: a second digital switching signal controlling operation of the detection circuit.

Figure 1:
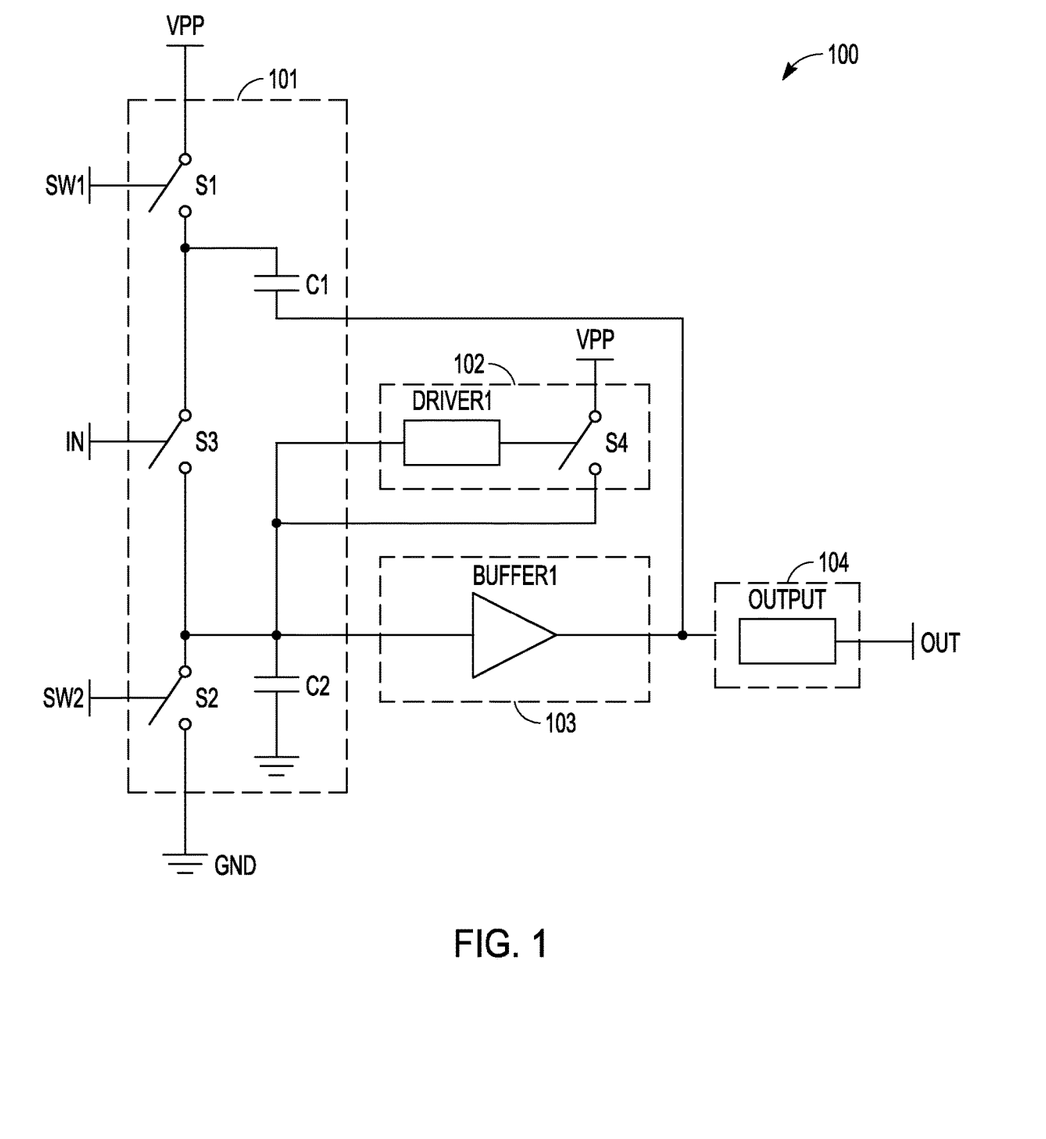
FIG. 1 illustrates an example block diagram of a detection circuit.

FIG. 1 illustrates an example block diagram of a detection circuit 100 for use in an electronic device such as a memory device. Detection circuit 100 can receive an input signal indicative of a data state and detect the data state.

Detection circuit 100 includes a power supply voltage node (VPP) to receive a power supply voltage, a ground node (GND, representing an example of a reference node) to provide a power supply ground level (representing an example of a reference level), and charge sharing circuitry 101 coupled between the VPP node and the GND node. The charge sharing circuitry 101 includes a first capacitor (C1), a first switch (S1), a second capacitor (C2), a second switch (S2), and a third switch (S3). C1 has a first terminal and a second terminal. S1 is coupled between the VPP node and the first terminal of C1. S1 is coupled to a first switch signal (SW1) node to receive SW1 and be driven by SW1 to charge C1. C2 has a first terminal and a second terminal, and the second terminal of C2 is coupled to the GND node. S2 is coupled between the first terminal of C2 and the GND node. S2 is coupled to a second switch signal (SW2) node to receive SW2 and be driven by SW2 to discharge C2. S3 is coupled between the first terminal of C1 and the first terminal of C2. S3 is coupled to an input (IN) node to receive an input signal and can be driven by the input signal for detecting the data state using charge sharing between C1 and C2. The voltage at the first terminal of C2 is indicative of the data state.

Detection circuit 100 can further include semi-latch circuitry 102. Semi-latch circuitry 102 can be a switching circuit coupled between the VPP node and the first terminal of the second capacitor. The switching circuit can be driven by the voltage at the first terminal of C2 to reduce a time for charging C2 when S3 is closed and to latch the voltage on C2 when S3 is open. As illustrated in FIG. 1 for example, semi-latch circuitry 102 can include a switch driver (DRIVER1) and a fourth switch (S4). DRIVER1 is coupled to the first terminal of C2 and can produce a driving signal. S4 is coupled between the VPP node and the first terminal of C2. S4 can be driven by the driving signal produced by DRIVER1.

Detection circuit 100 can further include boosting circuitry 103. Boosting circuitry 103 can be a buffer having a buffer input coupled to the first terminal of C2 and a buffer output coupled to the second terminal of C1 to stabilize a voltage at the buffer output.

Detection circuit 100 can further include output circuitry 104. Output circuitry 104 is an output buffer (OUTPUT) coupled between the buffer output of boosting circuitry 103 and an output (OUT) node. Output circuitry 104 can produce an output signal at the OUT node based on the voltage at the buffer output. The output signal represents the detected data state.

Figure 2:
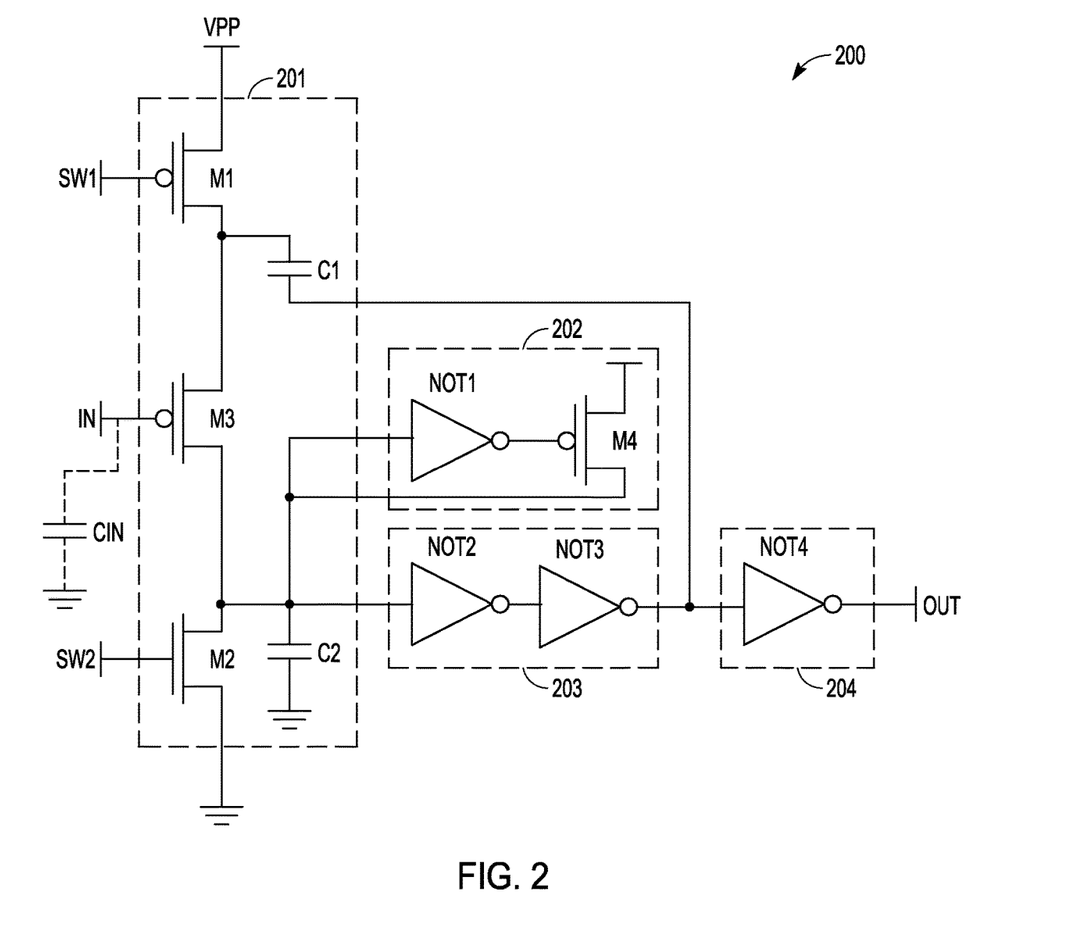
FIG. 2 illustrates an example circuit diagram of a detection circuit, such as the detection circuit of FIG. 1.

FIG. 2 illustrates an example circuit diagram of a detection circuit 200. Detector circuit 200 is coupled to:
an input (IN) node to receive an input signal indicative of the data state;
an output (OUT) node to provide an output signal representing the detected data state;
a power supply voltage (VPP) node to receive a power supply voltage (VPP);
a first switch signal (SW1) node to receive a first switching signal (SW1);
a second switch signal (SW2) node to receive a second switching signal (SW2); and
a ground (GND) node to provide a power supply ground level.

Detection circuit 200 can represent an example of implementation of detection circuit 100 and can include charge sharing circuitry 201, semi-latch circuitry 202, boosting circuity 203, and output circuitry 204, which can respectively represent implementation examples of the charge sharing circuitry 101, the semi-latch circuitry 102, the boosting circuity 103, and the output circuitry 104.

Charge sharing circuitry 201 includes:
a first capacitor (C1) having a first terminal and a second terminal;
a first transistor (M1, an example of S1), a PMOS transistor having a drain connected to the first terminal of C1, a source connected to the VPP node, and a gate connected to the SW1 node;
a second capacitor (C2) having a first terminal and a second terminal, the second terminal connected to the GND node;
a second transistor (M2, an example of S2), an NMOS transistor having a drain connected to the first terminal of C2, a source connected to the GND node, and a gate connected to the SW2 node; and
a third transistor (M3, also referred to as the input transistor, an example of S3), a PMOS transistor having a drain connected to the first terminal of C2 (the drain of M2), a source connected to the first terminal of C1 (the drain of M1), and a gate connected to the input (IN) node.

In an example, C2 represents a parasitic capacitance. In other words, the parasitic capacitance is sufficient for the purpose of C1, so there is no need to construct a capacitor.

S3 can be driven by the input signal to detect the data state by charge sharing between C1 and C2. Charge sharing circuitry 201 is to perform the detection starting with a preliminary phase followed by a voltage threshold compensation phase and a detection phase, as discussed below with reference to FIGS. 3, 4, and 5, respectively.

Semi-latch circuitry 202 includes:
a first inverter (NOT1, an example of DRIVER1) having an input connected to the first terminal of C2 and an output to provide a driving signal; and
a fourth transistor (M4, an example of S4), a PMOS transistor having a drain connected to the first terminal of C2, a source connected to the VPP node, and a gate connected to the output of NOT1 to receive the driving signal;

Boosting circuitry 203 can be a buffer (an example of BUFFER1) that includes:
a second inverter (NOT2) having an input connected to the first terminal of C2 and an output; and
a third inverter (NOT3) having an input connected to the output of NOT2 and an output.

Output circuitry 204 includes a fourth inverter (NOT4, an example of OUTPUT) having an input connected to the output of NOT3 and an output connected to the OUT node.

Figure 3:
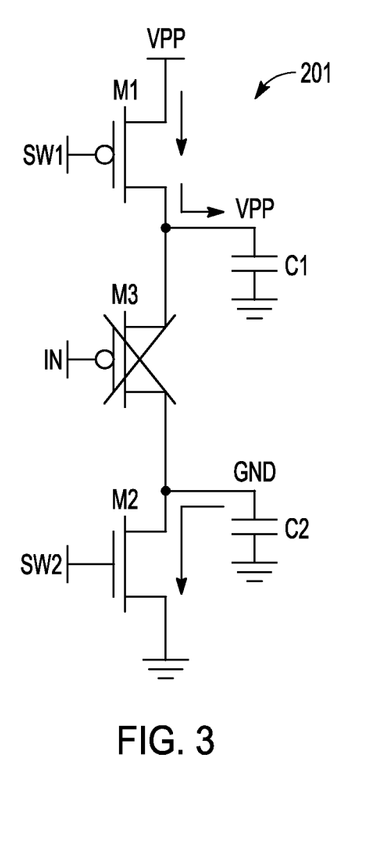
FIG. 3 illustrates an example of operation of charging sharing circuitry of the detection circuit of FIG. 2 during a preliminary phase.

FIG. 3 illustrates an example of operation of charge sharing circuitry 201 during the preliminary phase. During the preliminary phase, detection circuit 200 is initialized by charging C1 to VPP and fully discharging C2. C1 is charged to VPP by turning on M1 (i.e., closing S1). C2 is discharged by turning on M2 (i.e., closing S2). M3 is off. The preliminary phase is long enough to make sure C2 is fully discharged or is discharged to at least a minimum threshold voltage.

Figure 4:
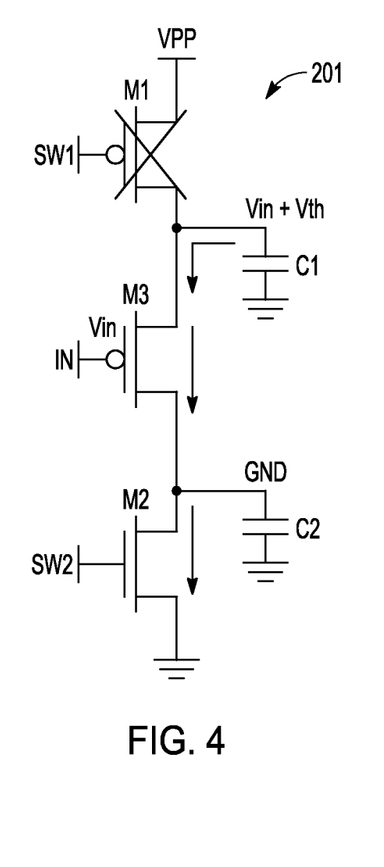
FIG. 4 illustrates an example of operation of the charging sharing circuitry of the detection circuit of FIG. 2 during a voltage threshold compensation phase.

FIG. 4 illustrates an example of operation of charge sharing circuitry 201 during the voltage threshold compensation phase. During the voltage threshold compensation phase, C1 is discharged to the voltage at the IN node (Vin) plus a threshold (Vth), i.e., Vin+Vth. M1 is turned off (i.e., S1 is open) upon charging C1 to VPP, leaving detection circuit 200 with a stable input. The threshold variations from device to device do not affect detection circuit 200 because in every case M2 is at the edge of turning on.

Optionally, an input capacitor (CIN) can be connected between the IN node and the GND node to boost Vin (by a DC voltage level). This additional CIN introduces a margin against the undesired switching of the structure due to leakage through M3 and reduces the duration of the voltage threshold compensation phase by shortening the time for C1 to be discharged to Vin+Vth.

Figure 5:
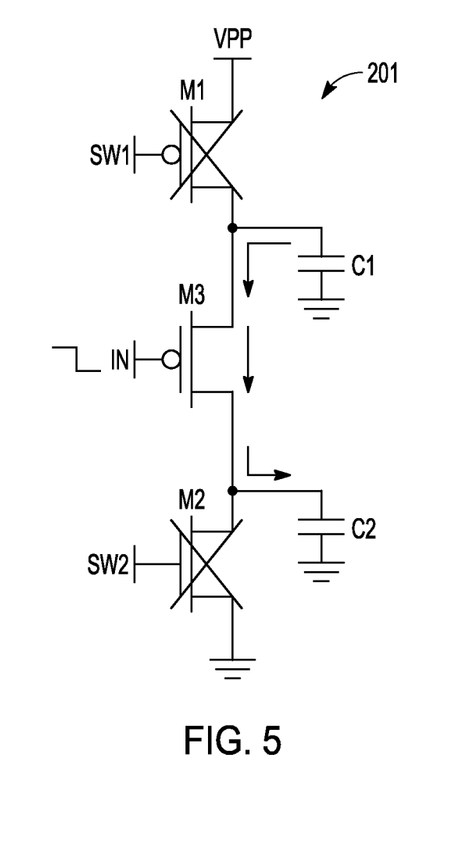
FIG. 5 illustrates an example of operation of the charging sharing circuitry of the detection circuit of FIG. 2 during a detection phase.

FIG. 5 illustrates an example of operation of charge sharing circuitry 201 during the detection phase. During the detection phase, M2 is turned off (i.e., S2 is open), so that no current is flowing in M2. If the data state is low (data bit=0), Vin drops slowly, M3 is off (i.e., S3 is open). If the data state is high (data bit=1), Vin drops quickly to turn on M3 (i.e., close S3), thereby connecting C1 and C2. M2 is turned off when Vin drops (data bit=1). C2 starts to charge up as M2 is turned on. Because C2 is much smaller than C1 and the final voltage on C2 is close to the initial voltage of C1, C2 can be represented by the parasitic capacitance of M2, without the need for inserting an extra capacitor. The small capacitance of C2 allows for a faster transition.

Figure 6:
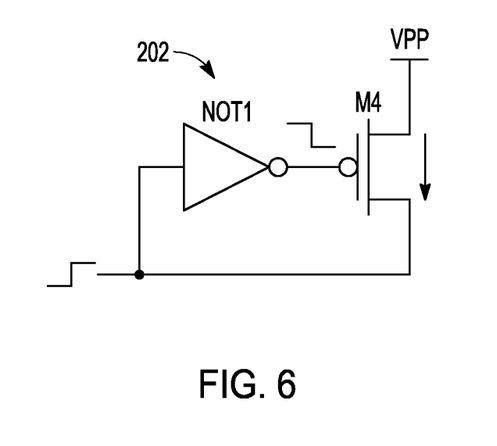
FIG. 6 illustrates an example of operation of semi-latch circuitry of the detection circuit of FIG. 2.

FIG. 6 illustrates an example of operation of semi-latch circuitry 202. Semi-latch circuitry 202 can be driven by a voltage on C2 to reduce a time for charging C2 when M3 is on (i.e., S3 is closed) during the detection phase and to latch the voltage on C2 when M3 is off (i.e., S3 is open). The speed of the transition provided by charge sharing circuity 201 (without additional circuitry) is determined by the time constant of the charge sharing stage: $\tau=R*(C1+C2)$, where R is the resistance of M3. Semi-latch circuitry 202 and boosting circuitry 203 are added to increase the speed of detection circuit 200. When C2 starts to be charged, the voltage at the gate of M4 reduces, and M4 charges up C2, thereby reducing the charging time of C2. Such boosting shortens the signal transition time at the input of NOT1, so the input signal to NOT1 reaches the threshold of NOT1 very quickly, thereby requiring little power consumption for the operation of NOT1.

Semi-latch circuitry 202 provides for high-voltage feedback with small size, low power consumption, and fast speed by using 3 transistors (M4 and 2 transistors of NOT1). It addresses the disadvantages of using a level shifter to provide a high-voltage feedback signal. Such a level shifter may have a large circuit size, cause a delay in the detection process, and have a high power consumption due to a delayed turn-off.

Figure 7:
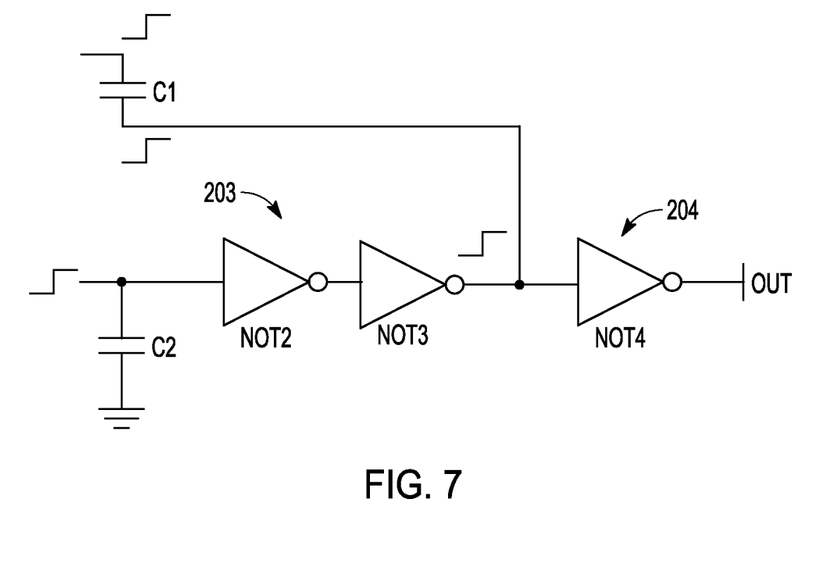
FIG. 7 illustrates an example of operation of boosting circuitry of the detection circuit of FIG. 2.

FIG. 7 illustrates an example of operation of boosting circuitry 203. Boosting circuitry 203 can stop flow of the current in detection circuit 200 by boosting the voltage on the second terminal of C1, thereby stabilizing the voltage at the output of NOT3 to complete the detection process. Boosting circuitry 203 functions in parallel with semi-latch circuitry 202. While semi-latch circuitry 202 finishes the transition on C2, boosting circuity 203 acts on C1 to expedite and complete the detection process.

Figure 8:
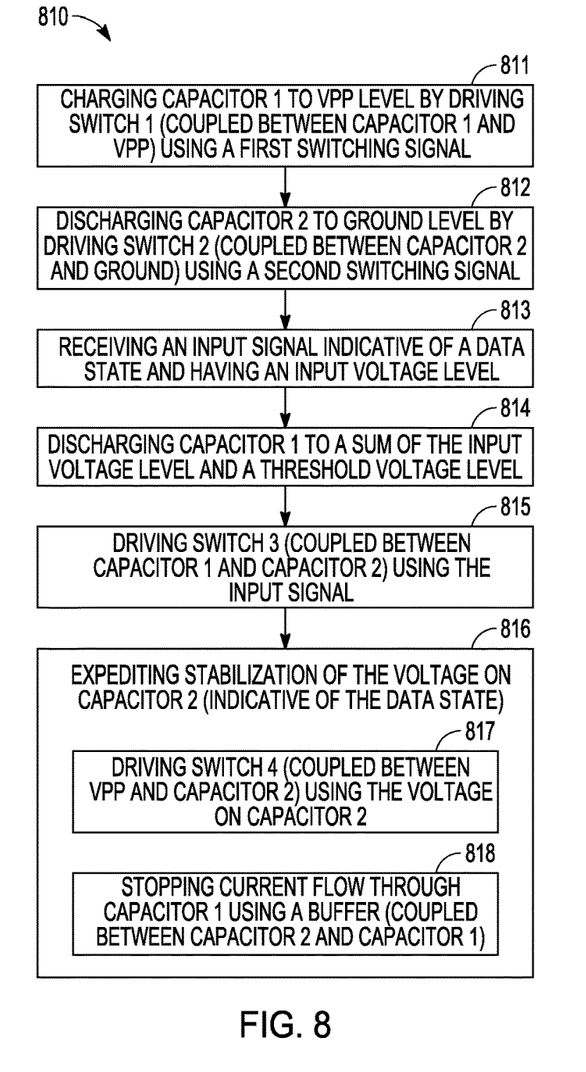
FIG. 8 illustrates an example of a method for detecting a data state.

FIG. 8 illustrates an example of a method 810 for detecting a data state. Method 810 can be performed, for example, using detection circuit 100 or using the implementation example of detection circuit 200 from FIG. 2.

At operation 811, a first capacitor is charged to a power supply voltage level by driving a first switch coupled between the first capacitor and a power supply voltage using a first switching signal. At operation 812, a second capacitor is discharged to a ground or reference level by driving a second switch coupled between the second capacitor and a reference using a second switching signal. A parasitic capacitance of a switch can optionally be utilized as the second capacitor. At operation 813, an input signal is received from a memory cell. The input signal is indicative of the state of the data bit in the memory cell. The input signal has an input voltage level. The input signal can be received from a memory cell of a memory device, and the data state indicates a value of a data bit stored in the memory cell. At operation 814, the first capacitor is discharged to a voltage level being a sum of the input voltage level and a threshold voltage level. An input capacitor can be used to boost the input voltage level, thereby reducing the time for discharging the first capacitor to the voltage level that is the sum of the input voltage level and the threshold voltage level. At operation 815, a third switch coupled between the first capacitor and the second capacitor is driven using the input signal. The second capacitor remains discharged when the third switch is open and electrically connected to the first capacitor for charge-sharing between the first capacitor and the second capacitor when the third switch is closed. The voltage on the second capacitor indicates the data state, for example, when stabilized after the input signal is received, such as after a settling time.

At operation 816, the stabilization of the voltage on the second capacitor is expedited. Operation 816 can include concurrent operations 817 and 818. At operation 817, a fourth switch coupled between the power supply voltage and the second capacitor is driven using the voltage on the second capacitor to charge the second capacitor, when the third switch is closed, and the fourth switch is used to latch the voltage (representing the data state to be detected) on the second capacitor when the third switch is open. At operation 818, current flow through the first capacitor is stopped using a buffer coupled between the second capacitor and the first capacitor. In an example, a respective MOSFET device can be used to function as each of the first switch, the second switch, the third switch, and the fourth switch. Other types of switches can similarly be used.

Figure 9:
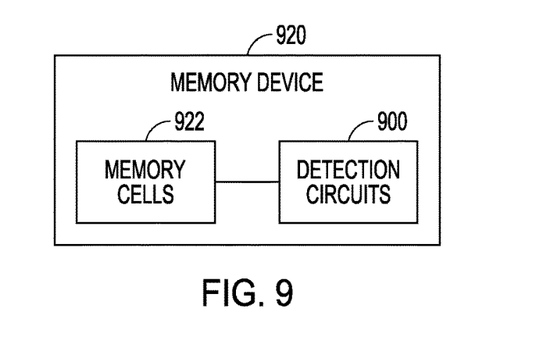
FIG. 9 illustrates an example of a memory device including detection circuits such as the detection circuit of FIG. 1 or FIG. 2.

FIG. 9 illustrates an example of a memory device 920 that includes memory cells 922 and detection circuits 900. Memory cells 922 can each store a data bit. Detection circuits 900 can each detect a data state of the data bit. The data state can be a high state indicating data "1" or a low state indicating data "0". In various examples, each circuit of detection circuits 900 can be used for data state detection for one or more cells of memory cells 922.

Examples of memory device 920 may include, by way of non-limiting example only, both volatile and non-volatile memory. Volatile memory requires power to maintain its data, and includes random-access memory (RAM), in various forms, such as dynamic random-access memory (DRAM) or synchronous dynamic random-access memory (SDRAM), among others. Non-volatile memory may retain stored data when not powered, and may include one or more storage technologies, such as flash memory (e.g., NAND or NOR flash), electrically erasable programmable ROM (EEPROM), static RAM (SRAM), Ferroelectric RAM (Fe- RAM), erasable programmable ROM (EPROM), holographic random access memory (HRAM), resistance variable memory, such as phase-change random-access memory (PCRAM), resistive random-access memory (RRAM), magnetoresistive random-access memory (MRAM), or 3D XPoint™ memory, among others. The present subject matter can be applied, by way of example, but not by way of restriction, to such memory devices to increase the maximum frequency at which the system can operate. In various embodiments, the present subject matter can be applied in any electronic device with CMOS circuitry for increasing operational speed and/or improving signal integrity.

Gains in memory density have been achieved through the inclusion of additional memory on a given die. One technique to increase density of a memory die includes physically layering or stacking multiple memory dies into a stacked array, and the stacked array can be packaged together. In various examples, memory device 920 can include stacked memory dies in a single package.

In some embodiments, a stacked memory, or memory die stack, can include a primary memory die and one or more secondary memory dies. Inter-die communication between the primary memory die and the secondary memory die(s) can use an intra-package bus that is internal to the package, and a host device only directly interfaces with the primary memory die of the memory stack. That is, in some examples, an external host device may not see or directly communicate with one or more secondary memory dies of a memory die stack, and instead only a designated primary memory die in a package communicates with the external host device. In an example, the intra-package bus includes channels or paths between the primary memory die and the internal (secondary) dies and can be completely internal to the memory device package.

Figure 10:
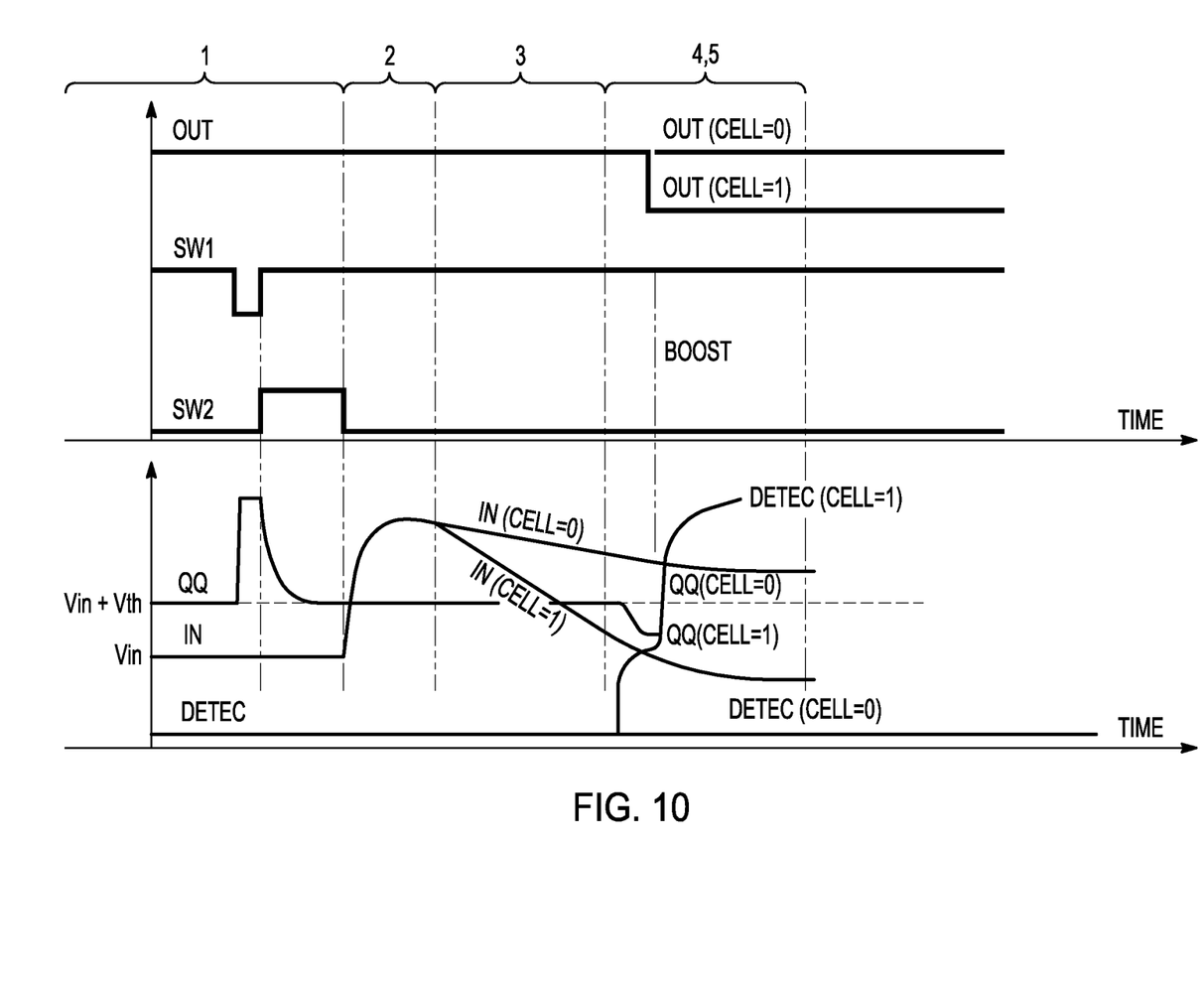
FIG. 10 illustrates an example timing diagram of operation of the detection circuit of FIG. 2.

FIG. 10 illustrates an example signal timing diagram corresponding to an example operation of detection circuit 200. Signals shown in the timing diagram include:
OUT: voltage of the output signal at the OUT node;
SW1: voltage of the first switching signal at the SW1 node;
SW2: voltage of the second switching signal at the SW2 node;
QQ: voltage at the first terminal of C1 (the drain of M1), i.e., Vin+Vth;
IN: voltage of the input signal at the IN node; and
DETEC: voltage at the first terminal of C2 (the drain of M2).

The example of FIG. 10 includes various time intervals labeled 1 through 5. The timing of operation of detection circuit 200 includes:
1. At interval 1, SW1 has a small impulse to charge the QQ node (C1), and M3 is compensated after the voltage at the QQ node reaches Vin+Vth;
2. At interval 2, SW2 goes low, and the DETECT node is no longer connected to the GND node;
3. At interval 3, the voltage at the IN node goes high, and the input signal is developed on it;
4. At interval 4-5, in case of CELL=0 (data 0): the QQ and DETEC nodes are connected, and the voltage at the DETEC node goes high; and
5. At interval 4-5, in case of CELL=1 (data 1): the voltage at DETEC node is boosted by boosting circuitry 203 (the inventors NOT2 and NOT3), and the data is latched.

Current consumption of the detection circuit 200 can be approximately 0.5 µA, which can be considered as negligible for memory sensing. Detection circuit 200 thus provides a memory or data state detector that has, among other things, low power consumption, allows feedback to disable the sense detector, contains a latch within the detection so no other latch is needed, matches MOS transistor thresholds, and has small area because it does not include or use a level shifter.

Figure 11:
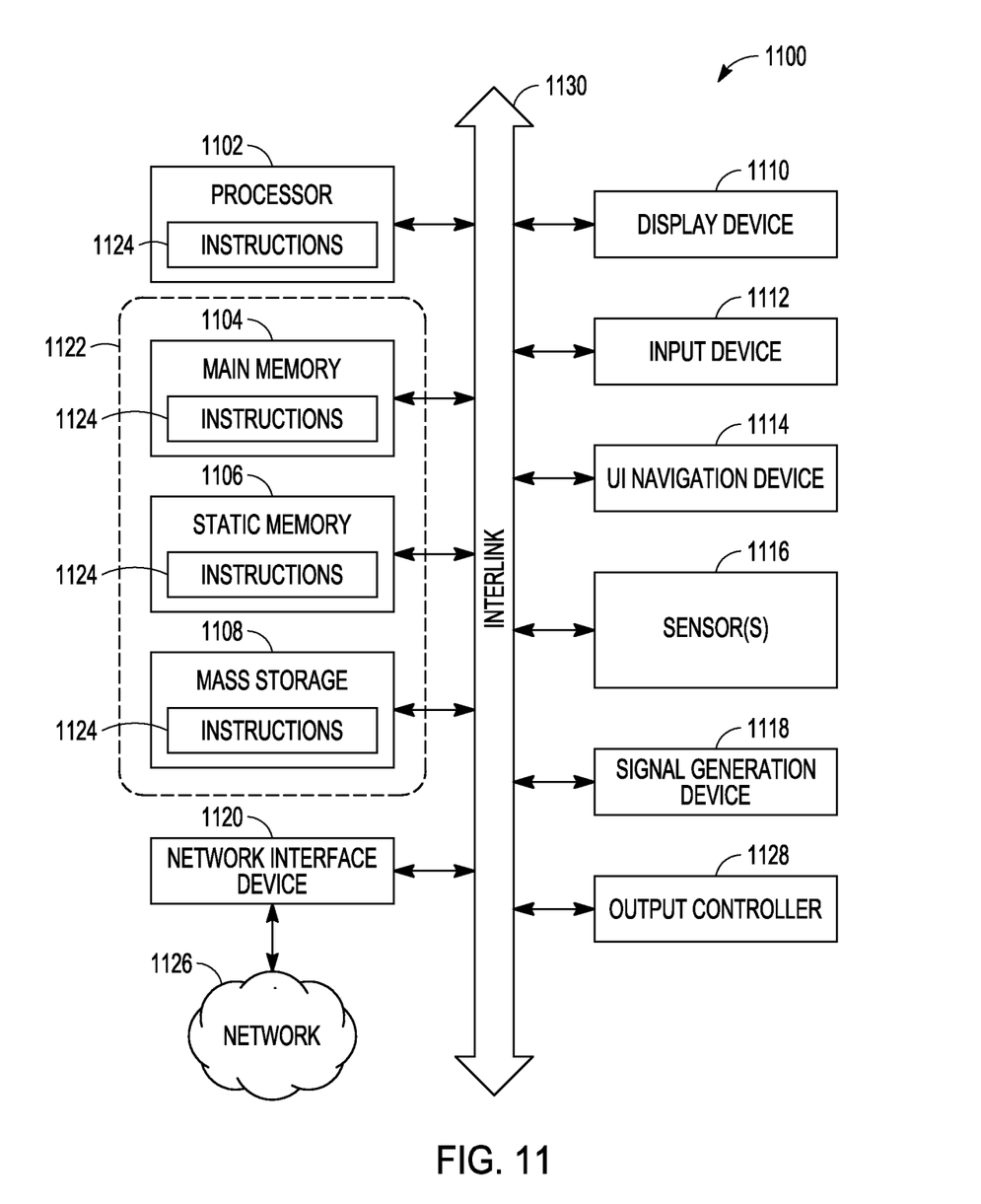
FIG. 11 illustrates a block diagram of an example machine with which, in which, or by which any one or more of the techniques discussed herein can be implemented

FIG. 11 illustrates a block diagram of an example machine 1100 with which, in which, or by which any one or more of the techniques (e.g., circuits or methods) discussed herein can be implemented. Examples, as described herein, can include, or can operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership can be flexible over time. Circuitries include members that can, alone or in combination, perform specified operations when operating. In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 1100 can operate as a standalone device or can be connected (e.g., networked) to other machines. In a networked deployment, the machine 1100 can operate in the capacity of a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1100 (e.g., computer system) can include a hardware processor 1102 or host device (e.g., the host device 402, a central processing unit (CPU), a graphics processing unit (GPU), a hardware processor core, or any combination thereof), a main memory 1104, a static memory 1106 (e.g., memory or storage for firmware, microcode, a basic-input-output (BIOS), unified extensible firmware interface (UEFI), etc.), and mass storage device 1108 or memory die stack (e.g., a memory die stack, hard drives, tape drives, flash storage, or other block devices) some or all of which can communicate with each other via an interlink 1130 (e.g., bus). The machine 1100 can further include a display device 1110, an alphanumeric input device 1112 (e.g., a keyboard), and a user interface (UI) Navigation device 1114 (e.g., a mouse). In an example, the display device 1110, the input device 1112, and the UI navigation device 1114 can be a touch screen display. The machine 1100 can additionally include a mass storage device 1108 (e.g., a drive unit), a signal generation device 1118 (e.g., a speaker), a network interface device 1120, and one or more sensor(s) 1116, such as a global positioning system (GPS) sensor, compass, accelerometer, or other sensor. The machine 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1102, the main memory 1104, the static memory 1106, or the mass storage device 1108 can be, or include, a machine-readable media 1122 on which is stored one or more sets of data structures or instructions 1124 (e.g., software) embodying or used by any one or more of the techniques or functions described herein. The instructions 1124 can also reside, completely or at least partially, within any of registers of the hardware processor 1102, the main memory 1104, the static memory 1106, or the mass storage device 1108 during execution thereof by the machine 1100. In an example, one or any combination of the hardware processor 1102, the main memory 1104, the static memory 1106, or the mass storage device 1108 can constitute the machine-readable media 1122. While the machine-readable media 1122 is illustrated as a single medium, the term "machine-readable medium" can include a single medium or multiple media (e.g., a centralized or distributed database, or associated caches and servers) configured to store the one or more instructions 1124.

The term "machine-readable medium" can include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1122 can be representative of the instructions 1124, such as instructions 1124 themselves or a format from which the instructions 1124 can be derived. This format from which the instructions 1124 can be derived can include source code, encoded instructions (e.g., in compressed or encrypted form), packaged instructions (e.g., split into multiple packages), or the like. The information representative of the instructions 1124 in the machine-readable media 1122 can be processed by processing circuitry into the instructions to implement any of the operations discussed herein. For example, deriving the instructions 1124 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1124.

In an example, the derivation of the instructions 1124 can include assembly, compilation, or interpretation of the information (e.g., by the processing circuitry) to create the instructions 1124 from some intermediate or preprocessed format provided by the machine-readable media 1122. The information, when provided in multiple parts, can be combined, unpacked, and modified to create the instructions 1124. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1124 can be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 can include one or more physical jacks (e.g., Ethernet, coaxial, or phone jacks) or one or more antennas to connect to the network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine-readable medium.

Some non-limiting examples (Examples 1-20) of the present subject matter are provided as follows:

In Example 1, an electronic device includes a detection circuit that may be configured to receive an input signal indicative of a data state and to detect the data state. The detection circuit may include a power supply voltage node to receive a power supply voltage, a reference node to provide a power supply reference level, and charge sharing circuitry. The charge sharing circuitry may include a first capacitor having a first terminal and a second terminal, a first switch coupled between the power supply voltage node and the first terminal of the first capacitor, a second capacitor having a first terminal and a second terminal, a second switch coupled between the first terminal of the second capacitor and the reference node, and a third switch coupled between the first terminal of the first capacitor and the first terminal of the second capacitor. The first switch may be configured to receive a first switch signal and to be driven by first switch signal to charge the first capacitor. The second terminal of the second capacitor may be coupled to the reference node. The second switch may be configured to receive a second switch signal and to be driven by the second switch signal to discharge the second capacitor. The third switch may be configured to be driven by the input signal to detect the data state using charge sharing between the first capacitor and the second capacitor. A voltage at the first terminal of the second capacitor is indicative of the data state.

In Example 2, the subject matter of Example 1 may optionally be configured such that the detection circuit further include semi-latch circuitry and boosting circuitry. The semi-latch circuitry includes a switching circuit coupled between the power supply voltage node and the first terminal of the second capacitor. The switching circuit is configured to be driven by the voltage at the first terminal of the second capacitor to reduce a time for charging the second capacitor when the third switch is closed and to latch the voltage on the second capacitor when the third switch is open. The boosting circuitry includes a buffer having a buffer input coupled to the first terminal of the second capacitor and a buffer output coupled to the second terminal of the first capacitor to stabilize a voltage at the buffer output.

In Example 3, the subject matter of Example 2 may optionally be configured such that the detection circuit further includes output circuitry coupled to the buffer output and configured to produce an output signal representing the detected data state based on the voltage at the buffer output.

In Example 4, the subject matter of Example 3 may optionally be configured to include a memory device. The memory device includes memory cells each configured to store a data bit and sensing circuitry configured to read the data bits from the memory cells. The sensing circuitry includes the detection circuit coupled to one or more memory cells to detect the data state of the data bit stored in each memory cell of the one or more memory cells.

In Example 5, the subject matter of Example 4 may optionally be configured such that the memory device includes a holographic random access memory device.

In Example 6, the subject matter of Example 4 may optionally be configured such that the memory device includes a stacked array of multiple memory dies each including multiple memory cells.

In Example 7, the subject matter of any one or any combination of Examples 3 to 6 may optionally be configured such that the first switch includes a first transistor being a p-channel metal-oxide-semiconductor field-effect transistor having a first drain coupled to the first terminal of the first capacitor, a first source coupled to the power supply voltage node, and a first gate to receive the first switching signal, the second switch including a second transistor being an n-channel metal-oxide-semiconductor field-effect transistor having a second drain coupled to the first terminal of the second capacitor, a second source coupled to the reference node, and a second gate to receive the second switching signal, and the third switch includes a third transistor being a p-channel metal-oxide-semiconductor field-effect transistor having a third drain coupled to the first terminal of the second capacitor, a third source coupled to the first terminal of the first capacitor, and a third gate to receive the input signal.

In Example 8, the subject matter of Example 7 may optionally be configured such that the detection circuit further includes an input capacitor coupled between the third gate and the reference node.

In Example 9, the subject matter of any one or any combination of Examples 7 and 8 may optionally be configured such that the second capacitor comprises a parasitic capacitance of the second switch.

In Example 10, the subject matter of any one or any combination of Examples 7 to 9 may optionally be configured such that the semi-latch circuitry includes a switch driver and a fourth switch. The switch driver is coupled to the first terminal of the second capacitor and configured to produce a driving signal. The fourth switch is coupled between the power supply voltage node and the first terminal of the second capacitor and is configured to be driven by the driving signal produced by the switch driver.

In Example 11, the subject matter of Example 10 may optionally be configured such that the switch driver includes a first inverter having a first inverter input coupled to the first terminal of the second capacitor and a first inverter output to provide the driving signal, and the fourth switch includes a fourth transistor being a p-channel metal-oxide-semiconductor field-effect transistor having a fourth drain coupled to the first terminal of the second capacitor, a fourth source coupled to the power supply voltage node, and a fourth gate coupled to the first inverter output to receive the driving signal.

In Example 12, the subject matter of Example 11 may optionally be configured such that the buffer of the boosting circuitry includes a second inverter having a second inverter input and a second inverter output and a third inverter having a third inverter input and a third inverter output. The second inverter input is the buffer input. The third inverter input is coupled to the second inverter output. The third inverter output is the buffer output.

In Example 13, an electronic circuit may include an input node to receive an input signal indicative of a data state, a power supply voltage node to receive a power supply voltage, a first switch node to receive a first switching signal, a second switch node to receive a second switching signal, a ground node to provide a power supply ground level, and charge sharing circuitry. The sharing circuitry may include: a first transistor being a p-channel metal-oxide-semiconductor field-effect transistor having a first drain, a first source coupled to the power supply voltage node, and a first gate coupled to the first switch node; a first capacitor having a first terminal and a second terminal, the first terminal coupled to the first drain; a second transistor being an n-channel metal-oxide-semiconductor field-effect transistor having a second drain, a second source coupled to the ground node, and a second gate coupled to the second switch node; a second capacitor formed by a parasitic capacitance at the second drain; and a third transistor being a p-channel metal-oxide-semiconductor field-effect transistor having a third drain coupled to the second drain, a third source coupled to the first drain, and a third gate coupled to the input node.

In Example 14, the subject matter of Example 13 may optionally be configured to further include semi-latch circuitry, boosting circuitry, an output node and output circuitry. The semi-latch circuitry include: a first inverter having a first inverter input and a first inverter output, the first inverter input coupled to the second drain; and a fourth transistor being a p-channel metal-oxide-semiconductor field-effect transistor having a fourth drain connected to the first inverter input, a fourth source coupled to the power supply voltage node, and a fourth gate coupled to the first inverter output. The boosting circuitry includes: a second inverter having a second inverter input and a second inverter output, the second inverter input coupled to the second drain; and a third inverter having a third inverter input and a third inverter output, the third inverter input coupled to the second inverter output, the third inverter output coupled to the second terminal of the first capacitor. The output node is to provide an output signal representing the data state. The output circuitry includes a fourth inverter having a fourth inverter input and a fourth inverter output, with the fourth inverter input coupled to the third inverter output and the fourth inverter output coupled to the output node.

In Example 15, a method is provided. The method may include: charging a first capacitor to a power supply voltage level by driving a first switch coupled between the first capacitor and a power supply voltage using a first switching signal; discharging a second capacitor to a reference level by driving a second switch coupled between the second capacitor and a reference potential using a second switching signal; receiving an input signal indicative of a data state, the input signal having an input voltage level; discharging the first capacitor to a voltage level being a sum of the input voltage level and a threshold voltage level; and driving a third switch coupled between the first capacitor and the second capacitor using the input signal. The second capacitor may remain discharged when the third switch is open and the second capacitor is electrically connected to the first capacitor for charge sharing between the first capacitor and the second capacitor when the third switch is closed. A voltage on the second capacitor indicates the data state following a settling time.

In Example 16, the subject matter of Example 15 may optionally further include expediting the stabilization of the voltage on the second capacitor by: driving a fourth switch coupled between the power supply voltage and the second capacitor using the voltage on the second capacitor, to charge the second capacitor when the third switch is closed and to latch the voltage on the second capacitor when the third switch is open; and stopping current flow through the first capacitor using a buffer coupled between the second capacitor and the first capacitor.

In Example 17, the subject matter of Example 16 may optionally include using a metal-oxide-semiconductor field-effect transistor to function as each of the first switch, the second switch, the third switch, and the fourth switch.

In Example 18, the subject matter of any one or any combination of Examples 15 to 17 may optionally include using a parasitic capacitance of the second switch as the second capacitor.

In Example 19, the subject matter of any one or any combination of Examples 15 to 18 may optionally further include connecting an input capacitor to boost the input voltage level.

In Example 20, the subject matter of any one or any combination of Examples 15 to 19 may optionally further include receiving the input signal from a memory cell of a memory device. The data state indicates a value of a data bit stored in the memory cell.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

It will be understood that when an element is referred to as being "on," "connected to" or "coupled with" another element, it can be directly on, connected, or coupled with the other element or intervening elements may be present. In contrast, when an element is referred to as being "directly on." "directly connected to" or "directly coupled with" another element, there are no intervening elements or layers present. If two elements are shown in the drawings with a line connecting them, the two elements can be either be coupled, or directly coupled, unless otherwise indicated.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electronic device, comprising:
a detection circuit configured to receive an input signal indicative of a data state and to detect the data state, the detection circuit including:
a power supply voltage node to receive a power supply voltage;
a reference node to provide a power supply reference level; and
charge sharing circuitry including:
a first capacitor having a first terminal and a second terminal;
a first switch coupled between the power supply voltage node and the first terminal of the first capacitor, the first switch configured to receive a first switch signal and to be driven by first switch signal to charge the first capacitor;
a second capacitor having a first terminal and a second terminal, the second terminal of the second capacitor coupled to the reference node;

a second switch coupled between the first terminal of the second capacitor and the reference node, the second switch configured to receive a second switch signal and to be driven by the second switch signal to discharge the second capacitor; and a third switch coupled between the first terminal of the first capacitor and the first terminal of the second capacitor, the third switch configured to be driven by the input signal to detect the data state using charge sharing between the first capacitor and the second capacitor, wherein a voltage at the first terminal of the second capacitor is indicative of the data state.

2. The electronic device of claim 1, wherein the detection circuit further comprises:

semi-latch circuitry including a switching circuit coupled between the power supply voltage node and the first terminal of the second capacitor, the switching circuit configured to be driven by the voltage at the first terminal of the second capacitor to reduce a time for charging the second capacitor when the third switch is closed and to latch the voltage on the second capacitor when the third switch is open; and boosting circuitry including a buffer having a buffer input coupled to the first terminal of the second capacitor and a buffer output coupled to the second terminal of the first capacitor to stabilize a voltage at the buffer output.

3. The electronic device of claim 2, wherein the detection circuit further comprises output circuitry coupled to the buffer output and configured to produce an output signal representing the detected data state based on the voltage at the buffer output.

4. The electronic device of claim 3, comprising a memory device including:

memory cells each configured to store a data bit; and sensing circuitry configured to read the data bits from the memory cells, the sensing circuitry including the detection circuit coupled to one or more memory cells to detect the data state of the data bit stored in each memory cell of the one or more memory cells.

5. The electronic device of claim 4, wherein the memory device comprises a holographic random access memory device.

6. The electronic device of claim 4, wherein the memory device comprises a stacked array of multiple memory dies each including multiple memory cells.

7. The electronic device of claim 3, wherein:

the first switch comprises a first transistor being a p-channel metal-oxide-semiconductor field-effect transistor having a first drain coupled to the first terminal of the first capacitor, a first source coupled to the power supply voltage node, and a first gate to receive the first switching signal;

the second switch comprises a second transistor being an n-channel metal-oxide-semiconductor field-effect transistor having a second drain coupled to the first terminal of the second capacitor, a second source coupled to the reference node, and a second gate to receive the second switching signal; and the third switch comprises a third transistor being a p-channel metal-oxide-semiconductor field-effect transistor having a third drain coupled to the first terminal of the second capacitor, a third source coupled to the first terminal of the first capacitor, and a third gate to receive the input signal.

8. The electronic device of claim 7, wherein the detection circuit further comprises an input capacitor coupled between the third gate and the reference node.

9. The electronic device of claim 7, wherein the second capacitor comprises a parasitic capacitance of the second switch.

10. The electronic device of claim 7, wherein the semi-latch circuitry comprises:

a switch driver coupled to the first terminal of the second capacitor and configured to produce a driving signal; and a fourth switch coupled between the power supply voltage node and the first terminal of the second capacitor, the fourth switch configured to be driven by the driving signal produced by the switch driver.

11. The electronic device of claim 10, wherein:

the switch driver comprises a first inverter having a first inverter input and a first inverter output, the first inverter input coupled to the first terminal of the second capacitor, the first inverter output to provide the driving signal; and the fourth switch comprises a fourth transistor being a p-channel metal-oxide-semiconductor field-effect transistor having a fourth drain coupled to the first terminal of the second capacitor, a fourth source coupled to the power supply voltage node, and a fourth gate coupled to the first inverter output to receive the driving signal.

12. The electronic device of claim 11, wherein the buffer of the boosting circuitry comprises:

a second inverter having a second inverter input and a second inverter output, the second inverter input being the buffer input; and a third inverter having a third inverter input and a third inverter output, the third inverter input coupled to the second inverter output, the third inverter output being the buffer output.

13. An electronic circuit, comprising:

an input node to receive an input signal indicative of a data state;

a power supply voltage node to receive a power supply voltage;

a first switch node to receive a first switching signal;

a second switch node to receive a second switching signal;

a ground node to provide a power supply ground level; and charge sharing circuitry including:

a first transistor being a p-channel metal-oxide-semiconductor field-effect transistor having a first drain, a first source coupled to the power supply voltage node, and a first gate coupled to the first switch node;

a first capacitor having a first terminal and a second terminal, the first terminal coupled to the first drain;

a second transistor being an n-channel metal-oxide-semiconductor field-effect transistor having a second drain, a second source coupled to the ground node, and a second gate coupled to the second switch node;

a second capacitor formed by a parasitic capacitance at the second drain; and a third transistor being a p-channel metal-oxide-semiconductor field-effect transistor having a third drain coupled to the second drain, a third source coupled to the first drain, and a third gate coupled to the input node.

14. The circuit of claim 13, further comprising:
semi-latch circuitry including:
- a first inverter having a first inverter input and a first inverter output, the first inverter input coupled to the second drain; and
- a fourth transistor being a p-channel metal-oxide-semiconductor field-effect transistor having a fourth drain connected to the first inverter input, a fourth source coupled to the power supply voltage node, and a fourth gate coupled to the first inverter output;

boosting circuitry including:
- a second inverter having a second inverter input and a second inverter output, the second inverter input coupled to the second drain; and
- a third inverter having a third inverter input and a third inverter output, the third inverter input coupled to the second inverter output, the third inverter output coupled to the second terminal of the first capacitor, an output node to provide an output signal representing the data state; and output circuitry including a fourth inverter having a fourth inverter input and a fourth inverter output, the fourth inverter input coupled to the third inverter output, the fourth inverter output coupled to the output node.

15. A method, comprising:
charging a first capacitor to a power supply voltage level by driving a first switch coupled between the first capacitor and a power supply voltage using a first switching signal;
discharging a second capacitor to a reference level by driving a second switch coupled between the second capacitor and a reference potential using a second switching signal;
receiving an input signal indicative of a data state, the input signal having an input voltage level;
discharging the first capacitor to a voltage level being a sum of the input voltage level and a threshold voltage level; and
driving a third switch coupled between the first capacitor and the second capacitor using the input signal, wherein the second capacitor remains discharged when the third switch is open and the second capacitor is electrically connected to the first capacitor for charge sharing between the first capacitor and the second capacitor when the third switch is closed,
wherein a voltage on the second capacitor indicates the data state following a settling time.

16. The method of claim 15, further comprising expediting the stabilization of the voltage on the second capacitor by:
driving a fourth switch coupled between the power supply voltage and the second capacitor using the voltage on the second capacitor, to charge the second capacitor when the third switch is closed and to latch the voltage on the second capacitor when the third switch is open; and
stopping current flow through the first capacitor using a buffer coupled between the second capacitor and the first capacitor.

17. The method of claim 16, further comprising using a metal-oxide-semiconductor field-effect transistor to function as each of the first switch, the second switch, the third switch, and the fourth switch.

18. The method of claim 17, further comprising using a parasitic capacitance of the second switch as the second capacitor.

19. The method of claim 18, further comprising connecting an input capacitor to boost the input voltage level.

20. The method of claim 15, further comprising receiving the input signal from a memory cell of a memory device, and wherein the data state indicates a value of a data bit stored in the memory cell.

* * * * *